United States Patent

[11] 3,621,081

| [72] | Inventor | James B. Prentice<br>Batesville, Ind. |
|---|---|---|
| [21] | Appl. No. | 786,371 |
| [22] | Filed | Dec. 23, 1968 |
| [45] | Patented | Nov. 16, 1971 |
| [73] | Assignee | The Procter & Gamble Company<br>Cincinnati, Ohio |

[54] OLIGOMERIC ESTER CHAIN CONDENSATES OF ETHANE-1-HYDROXY-1,1-DIPHOSPHONIC ACID
2 Claims, No Drawings

[52] U.S. Cl. .................................................. 260/924,
252/142, 252/152, 252/175, 260/931
[51] Int. Cl. .......................................................... C07f 9/38,
C07f 9/40
[50] Field of Search ............................................ 260/924,
931

[56] References Cited
UNITED STATES PATENTS
| 3,354,166 | 11/1967 | Garner .......................... | 260/924 X |
| 3,363,031 | 1/1968 | Birum .......................... | 260/931 |

*Primary Examiner*—Charles B. Parker
*Assistant Examiner*—Richard L. Raymond
*Attorneys*—Julius P. Filcik and Richard C. Witte

ABSTRACT: Organo-phosphorus compounds which are oligomeric ester chain condensates of ethane-1-hydroxy-1,1-diphosphonic acid having the following formula:

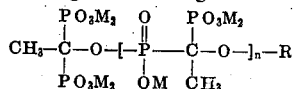

wherein M is a water-soluble cation; R is hydrogen or acetyl and $n$ has a numerical value in the range of 1 to about 16. The compounds are useful as sequestering agents and builders in detergent compositions.

OLIGOMERIC ESTER CHAIN CONDENSATES OF ETHANE-1-HYDROXY-1,1-DIPHOSPHONIC ACID

SUMMARY OF THE INVENTION

This invention relates to a new class of organo-phosphorus compounds which are oligomeric ester chain condensates of ethane-1-hydroxyl-1,1-diphosphonic acid. Condensates of ethane-1-hydroxy-1,1-diphosphonic acid have been known previously such as those described in U.S. Pat. No. 3,387,024 and U.S. Pat. No. 3,400,151. The known condensates have been, in each instance, dimers of ethane-1-hydroxy-1,1-diphosphonate units joined by ether bonds, that is, C–O–C bonds, and/or by anhydride bonds, that is P–O–P bonds. By contrast, the present invention relates to oligomeric ester compounds which contain ester bonds, that is, C–O–P bonds.

The oligomeric ester chain condensates of ethane-1-hydorxy-1,1-diphosphonic acid to which the present invention pertains have the following general formula

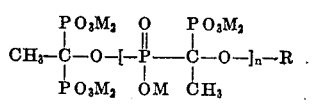

wherein each M is hydrogen, alkali metal, ammonium, alkylammonium, hydroxyalkyl ammonium, the alkyl and hydroxyalkyl group each having from one to about four carbons; R is hydrogen or acetyl; and $n$ has a numerical value in the range of 1 to about 16.

In the preceding formula, suitable alkali metals are sodium, potassium and lithium. Illustrative examples of alkyl ammonium cations are monomethylammonium, diethylammonium, tripropylammonium, and tetrabutylammonium. Illustrative examples of hydroxyalkyl ammonium cations are hydroxymethylammonium, hydroxyethylammonium, 2-hydroxypropylammonium, and 2-hydroxybutylammonium.

The numerical value for $n$ is preferably in the range of 2 to 12. Due to the complex nature of the oligomeric ester chain condensate, it is difficult to determine exact values for $n$. This point is discussed below.

Fully neutralized as well as partially neutralized salts are contemplated. As described below, such salts can be prepared by merely neutralizing the acid with an appropriate base compound.

Several alternative methods are available for preparing the compounds of the present invention. Some of these are described and illustrated below but others, equally satisfactory, will become apparent from the following description.

One satisfactory method for preparing an oligomeric ester chain condensate of ethane-1-hydroxy-1,1-diphosphonic acid involves a reaction between phosphorus acid and acetic anhydride. the molar proportion of these reactants should be in the range of from about 1:3 to about 1:20, phosphorus acid to acetic anhydride. An excess of the acetic anhydride has been discovered to enhance the recovery of the oligomeric ester. The oligomeric ester chain condensate formed by the reaction is insoluble in acetic anhydride and therefore readily precipitates out of solution. Recovery is thereby enhanced. Molar proportions in excess of 1:20 phosphorus acid to acetic anhydride can be used but without any apparent advantage.

This reaction can be controlled to prepare oligomeric esters which contain monomeric units in the lower range of the numerical value given above for $n$ or, alternatively, to prepare oligomeric esters containing monomeric units in the upper portion of the range from 1 to 16. In any case, the reaction product comprises a mixture of condensates having different chain lengths. Moreover, it is highly improbable that any molecular weight determination can be obtained with desired preciseness. For this reason, the value for $n$ is an estimate determined by applying the best and most accurate analytical means available. The means for controlling this reaction is described more fully below.

The reaction temperature is in the range of about 0° to about 80° C. Depending upon whether short chain condensates or longer chain condensates are desired, the temperature should be adjusted as explained below. The reaction generally takes from 5 minutes to about 48 hours. Again, the duration of the reaction must take into consideration the temperature at which the reaction is run and whether shorter or longer chain condensates are desired.

By operating with the above-prescribed reaction conditions, it is possible to control the reaction product which is prepared. For example, by running the reaction at a temperature of about 40° C. for about 30 minutes or about 5 minutes at 80° C., cooling the reaction mixture to a temperature in the range from about 0° to about 30° C. and digesting the reaction mixture at these lower temperatures for about 30 minutes to about 48 hours, a precipitate form which is a relatively longer chain oligomeric ester of ethane-1-hydroxy-1,1-diphosphonic acid. There is no limit to the length of the digestion period. Periods longer than 48 hours can be used if found necessary to precipitate the ester. This again will depend to a large extent upon the reaction temperature employed.

In another embodiment when the reaction temperature is held at about 60° C. a precipitate begins to form within about 20 minutes. Under these conditions, the oligomeric ester chain condensate of ethane-1-hydroxy-1,1-diphosphonic acid formed contains relatively fewer monomeric units of ethane-1-hydroxy-1,1-diphosphonic acid.

The reaction product under the prescribed conditions is comprised of a mixture of oligomeric esters having from 2 to about 16 monomeric units. Depending upon the reaction conditions, the reaction product represents a mixture of oligomeric esters. Factors which are involved and which determine the composition of the reaction mixture are the insolubility of the condensate in the reaction medium which hinders growth of long chains and the degradative effects of acetic acid which lends, especially at higher temperatures, to break down the oligomeric ester to other undesired byproducts.

The compounds of the present invention are the only condensates of ethane-1-hydroxy-1,1-diphosphonic acid which are known to contain a mixed anhydride (C–O–P) bond. The oligomeric ester chain condensates of this invention are unstable in the reaction mixture, and it is for this reason that a solvent is employed to terminate the reaction with the formation of the desired chain condensates. In the preceding discussion it has been pointed out that a large excess of acetic anhydride should be used. The reason for this is that the acetic anhydride is a suitable solvent for the reaction and, at the same time, the oligomeric ester chain condensates are insoluble in acetic anhydride. As a result, the desired oligomeric esters precipitate out of solution and can readily be recovered.

The stoichiometry of the reaction between phosphorous acid and acetic acid anhydride is 1:1 on a molar basis.

The precipitate which forms during the reaction is an amorphous solid reaction product.

The $p^{31}$NMR spectra for the oligomeric ester chain condensates of this invention display multiplet centered at $\Delta=-15$ to $-16$ parts per million. This NMR spectra eliminates the prospect of a P–O–P bonded condensate.

The possibility of branching along the chain is probable but only to a limited extent. For this reason, the oligomeric esters have at times been previously referred to as primarily chain condensates.

The carbon at the end of the chain condensate can contain either a hydroxyl group or an acetyl group as noted in the general formula given above.

As noted above, the oligomeric ester chain condensates of ethane-1-hydroxy-1,1-diphosphonic acid of the present invention are distinguished from previously known condensates in at least two ways. The first is the presence of a mixed anhydride bond (i.e., C–O–P rather than a C–O–C or C–O–P bond). Secondly, the compounds of the present invention are the only known condensates of ethane-1-hydroxy-1,1-diphosphonic acid which are larger than a dimer.

One of the major concerns in practicing the reaction described above is the formation of acetic acid as a natural byproduct when acetic anhydride is reacted with phosphorus acid. The acetic acid can extensively degrade the desired oligomeric ester chain condensates. It can be appreciated that higher acetic anhydride ratios are desirable in order to force out of solution the desired oligomeric ester chain condensates and, by the same token, higher acetic acid anhydride ratios dilute and therefore reduce the detrimental acetic acid attack. The reaction conditions should be chosen which best reduce acetic acid attack. Two ways of doing this as mentioned above is by lowering the reaction temperature and by diluting the acetic acid. An alternative way would be adding ketone to an acetic anhydride phosphorus reaction mixture which would react with the acetic acid formed from the reaction to make acetic anhydride.

Understanding of the present invention will be facilitated by the following examples. They are not intended to limit the scope of the present invention in any way but merely to set forth the best mode contemplated for practicing the present invention.

The molecular weights of the compounds of the present invention are in the range from about 500 to about 4,000 calculated as the sodium salts. Within the preferred range, the molecular weights are within a range of about 700 to about 3,000. These values are related to the numerical values of $n$ presented above.

EXAMPLE I

Phosphorus acid (416 g., 5.0 moles) was dissolved in acetic anhydride (4 l., 42.4 moles) and the reaction mixture heated to 50° C. over a 20 minute period. The reaction temperature of 50° C. was maintained for 20 minutes, at which time a cooling bath was applied and the reaction mixture cooled to 22° C. White solids formed at this point. The slurry was then digested for 20 hours, the solid product recovered by filtration and washed free of mother liquor with ethyl ether and dried. The total yield of product was 400 g. The reaction products was comprised of oligomeric ester chain condensation of ethane-1-hydroxy-1,1-diphosphonic acid having a molecular weight in the range from about 500 to about 4,000.

The acid product was added slowly, and with good stirring, to 280 g. of $NaHCO_3$ dissolved in 2.5 l. of water. The final pH of the solution was about pH 5. The clear aqueous salt solution was then divided by fractional precipitation. Increments of a nonsolvent (methanol and iso-propanol) were added and the solids formed were filtered off before the next increment was added. A total of six solid fractions were obtained. Data for the six fractions are given below.

| Fract. No. | Wt. | Average Mol. Wt. | Mole Ratio C/P | Na/P |
| --- | --- | --- | --- | --- |
| 1 | 34 g. | 1,000–3,000 | 1.07 | 0.95 |
| 2 | 89 g. | 800–2,500 | 1.12 | 0.99 |
| 3 | 67 g. | 700–2,200 | 1.14 | 0.97 |
| 4 | 52 g. | 650–2,000 | 1.19 | 0.97 |
| 5 | 22 g. | 600–1,900 | 1.21 | 0.99 |
| 6 | 25 g. | 500–1,600 | 1.29 | 0.97 |

Fractions no. 1 and 6 were used in the tests described below to demonstrate the effect of average molecular weight on the properties of the oligomeric chain condensate of EHDP. Fraction no. 1 corresponds to oligomer (A) and fraction no. 6 corresponds to oligomer (B) in the description below of the swatch-dip test.

EXAMPLE II

Phosphorus acid (100 g., 1.2 moles) was dissolved in acetic anhydride (1 l., 10.6 moles) and the mixture heated to 55° C. The temperature of 55° C. was maintained until a solid precipitate had formed (ca. 20 min.) and for an additional 5 minutes. The slurry was cooled to room temperature, digested 10 minutes, then filtered and washed free of mother liquor with ethyl ether. The yield of byproduct was 58 g. As judged from thin layer chromatography, this sample was similar to fraction no. 6 in example I. It was of a shorter average chain length than the product of example III.

EXAMPLE III

Phosphorus acid (41 g., 0.5 moles) was dissolved in acetic anhydride (400 cc., 4.2 moles) at room temperature. The clear solution was cooled to 15° C. and that temperature maintained. After 24 hours a precipitate had formed, which was digested for 20 days at 15° C., then filtered, washed free of mother liquor with ethyl ether, and dried. The yield was 42 g. of solid product. As judged from thin layer chromatography, this product was similar to fraction no. 1 of example I. It was of a longer average chain length than the product of example II.

The oligomeric ester chain condensates of the present invention have been discovered to possess several unique and totally unexpected properties. Foremost among these are their sequestering properties both in respect to their efficiency in sequestering and also in respect to how tightly the hardness metal, e.g., calcium, is bound by the sequestrant. These notable sequestering properties of the compounds of the present invention are illustrated below by performing a swatch-dip test and also by a nephelometric caprate sequestering test.

The swatch-dip test determines the relative sequestering ability of a compound in terms of how tightly the calcium is bound by the sequestrant. This test involves a procedure employing a fabric swatch impregnated with soap and an aqueous solution containing a predetermined level of calcium hardness minerals. Briefly, the procedure calls for preparing an aqueous solution containing the hardness ions and dipping or immersing into the solution a fabric swatch which has been impregnated with a measured amount of soap. The swatch remains in the solution for a predetermined amount of time. A measurement is then made to determine the amount of free calcium which has been absorbed by the fabric swatch. The identical procedure is then repeated but with a predetermined concentration of a sequestrant compound added to the aqueous solution containing the calcium ions. Measurements of adsorbed calcium are again made and comparisons drawn. Differences between the amounts of calcium adsorbed in tests with and without sequestrants are attributed to the ability of the sequestrant to sequester the calcium and thereby decrease the level of free calcium ion concentration available for absorption by the immersed fabric swatch. A percentage is obtained in this manner which is usually preferred to as "percentage hardness retained by sequestrant."

By using this procedure comparisons where made between sodium tripolyphosphate (STP), sodium ethylenediaminetetraacetate (EDTA), and the following compounds which are representative of the compounds to which the present invention pertains:

Oligomer (A) sodium salt of an oligomeric ester chain condensate of ethane-1-hydroxy-1,1-diphosphonic acid having an average molecular weight of 1,000–3,000 (fraction no. 1 example I)

Oligomeric (B) sodium salt of an oligomeric ester chain condensate of ethane-1-hydroxy-1,1-diphosphonic acid having an average molecular weight of 500–1,600 (fraction no. 6, example I).

STP is a widely recognized and a widely used sequestrant compound. EDTA is one of the most efficient sequestrants known. The test just described revealed surprisingly that the oligomeric ester chain condensates of the present invention are superior to both STP and EDTA in several respects.

For purposes of the swatch-dip test, a higher percentage value means that the sequestrant is able to more tightly bind a calcium ion, for example, than a sequestrant which scores a lower percentage figure. Based on these tests, it was discovered that at an equal concentration of 0.06 percent the oligomeric ester chain condensate described above as oligomer (A) received a percentage value of about 99 percent. The other test sample representative of the oligomeric ester chain condensates of the present invention, oligomeric B above, also received a percentage value of about 99 percent. EDTA likewise received a corresponding high score of about 98–99 percent. By contrast, STP obtained a percentage value of about 86 percent. Both of the representative compounds of the present invention were able to maintain their surprisingly high percentage values even at a concentration of sequestrant in the test solution of only about 0.015 percent. EDTA, however, fell off drastically at a concentration of sequestrant in the test solution below 0.04 percent.

The useful sequestering properties of the oligomeric ester chain condensates of the present invention can also be demonstrated by a nephelometric caprate sequestering test. The testing procedure employed is that described by Irani and Callis, *J. Physical Chemistry*, 64, 1938 (1960). The only modification is that caprate was used instead of oxalate ad the indicator of the nephelometric endpoint. In this demonstration the same two representative oligomeric ester chain condensates were tested as described in conjunction with the swatch-dip test. Comparisons were made with STP. The relative efficiency of each of the sequestrants (in grams of calcium per 100 grams of anhydrous sodium salt) were as follows.

TABLE

| Sequestrants | 8 | 9 | 10 | 11 | 12 |
|---|---|---|---|---|---|
| 1. Sodium oligomeric ester of EHDP (A) above | 13 | 16.8 | 18.8 | 18.7 | 18.1 |
| 2. Sodium oligomeric ester of EHDP (B) above | | 10.3 | 11.7 | 12.2 | |
| 3. Sodium tripolyphosphate | 0 | 7.5 | 7.8 | 7.7 | 6.5 |

The greater efficiency of the representative compounds of the present invention as sequestering agents over that of STP is apparent from the results given in the preceding table. It is quite apparent that at pH 8 STP had no measurable sequestering property. By the same token, both of the compounds representative of the present invention were capable of sequestering larger amounts of calcium even at lower pH's of 8–9 than the best score which STP was able to obtain across the full range of pH tested.

The sequestering properties described above indicate that the oligomeric chain condensates of ethane-1-hydroxy-1,1-diphosphonic acid are useful in numerous applications in which hardness minerals are to be sequestered. For instance, one useful embodiment of the present invention is a process for treating aqueous solutions, for example, softening of water, by adding to the solution an effective amount of an oligomeric ester chain condensate of the present invention. An especially preferred embodiment is one in which $n$ would be in the range of 2–6. The acid form or any of the salt forms can satisfactorily be used. Numerous other uses for sequestering agents of the type prepared by the present invention are described in the literature such as "Organic Sequestering Agents" authored by S. Chaberek and A. Martell, published in 1959 by John Wiley and Sons, Inc., New York, N.Y.

In addition to the unique sequestering properties while the compounds of the present invention possess, they also have valuable properties as builders in detergent compositions. Such an invention is the subject of a commonly assigned, copending patent application being filed concurrently herewith.

The foregoing description of the present invention has been presented describing certain operable and preferred embodiments. It is not intended that the invention should be so limited since variations and modifications thereof will be obvious to those skilled in the art, all of which are within the spirit and scope of this invention.

What is claimed is:

1. A compound having the formula

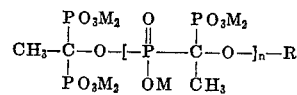

wherein each M is hydrogen, alkali metal, ammonium, alkylammonium, or hydroxyalkylammonium, the alkyl and hydroxyalkyl groups each having one to about four carbons; R is hydrogen or acetyl; and $n$ has a numerical value in the range of 1 to about 16.

2. A compound according to claim 2 in which $n$ has a numerical value in the range of 2 to about 12.

* * * * *